United States Patent
Wu et al.

(10) Patent No.: US 10,591,291 B2
(45) Date of Patent: Mar. 17, 2020

(54) IMAGING DEVICE, ROTATING DEVICE, DISTANCE MEASURING DEVICE, DISTANCE MEASURING SYSTEM AND DISTANCE MEASURING METHOD

(71) Applicants: BOE TECHNOLOGY GROUP CO., LTD., Beijing (CN); PEKING UNIVERSITY, Beijing (CN)

(72) Inventors: Yanbing Wu, Beijing (CN); Xing Zhang, Beijing (CN); Yi Wang, Beijing (CN)

(73) Assignees: BOE TECHNOLOGY GROUP CO., LTD., Beijing (CN); PEKING UNIVERSITY, Beijing (CN)

( * ) Notice: Subject to any disclaimer, the term of this patent is extended or adjusted under 35 U.S.C. 154(b) by 118 days.

(21) Appl. No.: 15/750,019

(22) PCT Filed: Jan. 3, 2017

(86) PCT No.: PCT/CN2017/000026
§ 371 (c)(1),
(2) Date: Feb. 2, 2018

(87) PCT Pub. No.: WO2017/166887
PCT Pub. Date: Oct. 5, 2017

(65) Prior Publication Data
US 2018/0231375 A1    Aug. 16, 2018

(30) Foreign Application Priority Data

Mar. 31, 2016  (CN) .......................... 2016 1 0196256

(51) Int. Cl.
*H04N 7/18*       (2006.01)
*G01C 3/08*       (2006.01)
*G01C 11/02*      (2006.01)

(52) U.S. Cl.
CPC ................ *G01C 3/08* (2013.01); *G01C 11/02* (2013.01)

(58) Field of Classification Search
CPC ................................. G06T 7/70; G01C 3/085
(Continued)

(56) References Cited

U.S. PATENT DOCUMENTS

| 8,811,718 B2* | 8/2014 | Anai ...................... G01C 11/10 382/106 |
| 2003/0052971 A1* | 3/2003 | Gutta ..................... H04N 5/232 348/159 |

(Continued)

FOREIGN PATENT DOCUMENTS

| CN | 101858742 A | 10/2010 |
| CN | 103398696 A | 11/2013 |

(Continued)

OTHER PUBLICATIONS

The World Intellectual Property Organization (WIPO) International Search Report and Written Opinion for PCT/CN2017/000026 dated Mar. 30, 2017 10 Pages.

(Continued)

*Primary Examiner* — Fabio S Lima
(74) *Attorney, Agent, or Firm* — Anova Law Group, PLLC (57) ABSTRACT

A distance measuring device coupled to a camera and a rotator for driving the camera to rotate. The camera includes a photo sensor and a lens. The distance measuring device includes a distance obtaining module, an angle obtaining module, and a computing module coupled to the distance obtaining module and the angle obtaining module. The distance obtaining module is configured to obtain an unaligned target image of a target captured by the camera. A projection of the unaligned target image on a reference plane (Continued)

does not overlap with a projection of a center point of the photo sensor on the reference plane. The reference plane is perpendicular to a rotation axis of the camera. The distance obtaining module is further configured to calculate a projection distance between the projection of the unaligned target image and the projection of the center point. The angle obtaining module is configured to obtain a rotation angle between an unaligned position at which the camera captures the unaligned target image and an aligned position at which the camera captures an aligned target image of the target. A projection of the aligned target image on the reference plane overlapping with the projection of the center point of the photo sensor. The computing module is configured to calculate a target distance between the target and the imaging camera based on the projection distance and the rotation angle.

19 Claims, 7 Drawing Sheets

(58) Field of Classification Search
USPC .......................................... 382/106; 348/348
See application file for complete search history.

(56) References Cited

U.S. PATENT DOCUMENTS

| | | | |
|---|---|---|---|
| 2010/0079605 A1* | 4/2010 | Wang | H04N 5/225 348/208.4 |
| 2011/0135157 A1* | 6/2011 | Cho | G06T 7/73 382/106 |
| 2013/0057681 A1* | 3/2013 | Kawamura | H04N 5/23212 348/135 |
| 2013/0208108 A1* | 8/2013 | Chang | G01C 3/18 348/135 |
| 2013/0229484 A1* | 9/2013 | Furumura | H04N 5/23238 348/36 |
| 2014/0211001 A1* | 7/2014 | Kostka | G01B 11/245 348/142 |
| 2016/0353083 A1* | 12/2016 | Aoki | H04N 13/246 |

FOREIGN PATENT DOCUMENTS

| | | |
|---|---|---|
| CN | 104215217 A | 12/2014 |
| CN | 104677329 A | 6/2015 |
| CN | 105627995 A | 6/2016 |
| CN | 105698751 A | 6/2016 |
| CN | 205593526 U | 9/2016 |
| CN | 205748356 U | 11/2016 |
| JP | 2000249543 A | 9/2000 |
| JP | 2007322368 A * | 12/2007 |
| JP | 2007322368 A | 12/2007 |
| KR | 101238748 B1 | 3/2013 |
| KR | 20140133359 A | 11/2014 |
| TW | 201226856 A1 | 7/2012 |
| WO | 2017166887 A1 | 10/2017 |

OTHER PUBLICATIONS

State Intellectual Property Office of the P.R.C (SIPO) Office Action 1 for 201610196256.3 dated Aug. 14, 2017 11 Pages.

* cited by examiner

First position

FIG. 2(b)

Second position

IMAGING DEVICE, ROTATING DEVICE, DISTANCE MEASURING DEVICE, DISTANCE MEASURING SYSTEM AND DISTANCE MEASURING METHOD

CROSS-REFERENCE TO RELATED APPLICATION

This application is a national phase entry under 35 U.S.C. § 371 of International Application No. PCT/CN2017/000026, filed on Jan. 3, 2017, which claims priority to Chinese Patent Application No. CN201610196256.3, filed on Mar. 31, 2016. The above enumerated patent applications are incorporated by reference herein in their entirety.

TECHNICAL FIELD

The present disclosure generally relates to a three dimensional scanning technology and, more particularly, to an imaging device, a rotating device, a distance measuring device, a distance measuring system, and a distance measuring method.

BACKGROUND

In recent years, three dimensional (3D) scanning technologies have attracted widespread attention. A 3D scanning device is used to measure and output a distance between an object and the 3D scanning device. For example, the object may be in front of the 3D scanning device.

Conventional 3D scanning technologies include a binocular parallax method to measure distance. That is, a distance measuring system often includes two cameras to measure a distance between the distance measuring device and an object. Because two cameras are required for this method, such distance measuring system may be costly. Especially, when measuring a longer distance, the distance measuring system may need an extended baseline between the two cameras. Such an arrangement often increases the volume of the distance measuring system. As a result, the distance measuring system can be bulky and difficult to use.

SUMMARY

In one aspect, the present disclosure provides a distance measuring device coupled to a camera and a rotator for driving the camera to rotate. The camera includes a photo sensor and a lens. The distance measuring device includes a distance obtaining module, an angle obtaining module, and a computing module coupled to the distance obtaining module and the angle obtaining module. The distance obtaining module is configured to obtain an unaligned target image of a target captured by the camera. A projection of the unaligned target image on a reference plane does not overlap with a projection of a center point of the photo sensor on the reference plane. The reference plane is perpendicular to a rotation axis of the camera. The distance obtaining module is further configured to calculate a projection distance between the projection of the unaligned target image and the projection of the center point. The angle obtaining module is configured to obtain a rotation angle between an unaligned position at which the camera captures the unaligned target image and an aligned position at which the camera captures an aligned target image of the target. A projection of the aligned target image on the reference plane overlapping with the projection of the center point of the photo sensor. The computing module is configured to calculate a target distance between the target and the imaging camera based on the projection distance and the rotation angle.

In some embodiments, the computing module includes a first multiplier configured to calculate a first product of the projection distance and a focal length of the lens, a tangent function calculator configured to calculate a tangent function of the rotation angle, a second multiplier configured to calculate a second product of the tangent function of the rotation angle and the focal length of the lens, a subtractor configured to calculate a difference value between the projection distance and the second product, and a divider configured to divide the first product by the difference value to obtain the target distance.

In another aspect, the present disclosure provides a distance measuring system including a camera, a rotator coupled to the camera, a measurer, and a calculator. The camera has a photo sensor and a lens, and is configured to rotate along a rotation axis to capture an unaligned target image and an aligned target image of a target. A projection of the unaligned target image on a reference plane does not overlap with a projection of a center point of the photo sensor on the reference plane. A projection of the aligned target image on the reference plane overlaps with the projection of the center point. The reference plane is perpendicular to the rotation axis. The rotator is configured to drive the camera to rotate along the rotation axis. The measurer is configured to measure a projection distance between the projection of the unaligned target image and the projection of the center point of the photo sensor and measure a rotation angle between an unaligned position at which the camera captures the unaligned target image and an aligned position at which the camera captures the aligned target image. The calculator is configured to calculate a target distance between the target and the camera based on the projection distance and the rotation angle.

In some embodiments, the distance measuring system further includes a camera controller coupled to the camera and configured to control the camera to capture target images of the target during the rotation, a detector coupled to the camera and the camera controller and configured to detect a position of a projection of each of the target images on the reference plane, and a rotation controller coupled to the camera controller and the rotator, and configured to control the rotator to stop the camera to rotate when the projection of one of the target images overlaps with the projection of the center point of the photo sensor.

In some embodiments, the distance measuring system further includes a rotation controller coupled to the rotator and configured to control the rotator to drive the camera to continuously rotate for a time period after the aligned target image is captured.

In some embodiments, the distance measuring system further includes a direction determining module coupled to the rotator and configured to obtain a positional relationship between the target and the camera, determine a rotation direction for the camera based on the positional relationship, and control the rotator to drive the camera to rotate based on the rotation direction.

In some embodiments, the distance measuring system further includes an angle measuring device coupled to one of the rotator or the camera, and configured to measure the rotation angle.

In some embodiments, the calculator is coupled to the camera and the angle measuring device.

In some embodiments, the calculator includes a first multiplier configured to calculate a first product of the projection distance and a focal length of the lens, a tangent function calculator configured to calculate a tangent function of the rotation angle, a second multiplier configured to calculate a second product of the tangent function of the rotation angle and the focal length of the lens, a subtractor configured to calculate a difference value between the projection distance and the second product, and a divider configured to divide the first product by the difference value to obtain the target distance.

In some embodiments, a focal point of the lens is located at the center point of the photo sensor.

In some embodiments, the distance measuring system further includes an object determining module coupled to the camera and configured to obtain an image captured by the camera, detect objects in the image, and select the target from the objects.

In some embodiments, the object determining module includes an analyzing unit configured to obtain features of the objects, compare the features of the objects with a preset feature, and determine the target according to whether the features match the preset feature.

In another aspect, the present disclosure provides rotating device including a rotator configured to drive a camera to rotate about a rotation axis, a measurer, and a calculator. The measurer is configured to obtain an unaligned target image and an aligned target image of a target. A projection of the unaligned target image on a reference plane does not overlap with a projection of a center point of a photo sensor of the camera on the reference plane. A projection of the aligned target image on the reference plane overlaps with the projection of the center point. The reference plane is perpendicular to the rotation axis. The measurer is further configured to measure a projection distance between the projection of the unaligned target image and the projection of the center point of the photo sensor, and measure a rotation angle between an unaligned position at which the unaligned target image is captured and an aligned position at which the aligned image is captured. The calculator is configured to calculate a target distance between the target and the camera based on the projection distance and the rotation angle.

In some embodiments, the rotating device further includes a camera controller configured to control the camera to capture target images of the target during the rotation, a detector coupled to the camera controller and configured to detect a position of a projection of each of the target images on the reference plane, and a rotation controller coupled to the camera controller and the rotator and configured to control the rotator to stop the camera to rotate when the projection of one of the target images overlaps with the projection of the center point of the photo sensor.

In some embodiments, the rotating device further includes a rotation controller coupled to the rotator and configured to control the rotator to drive the camera to continuously rotate for a time period after the aligned target image is captured.

In some embodiments, the rotating device further includes a direction determining module coupled to the rotator and configured to obtain a positional relationship between the target and the camera, determine a rotation direction for the camera based on the positional relationship, and control the rotator to drive the camera to rotate based on the rotation direction.

In some embodiments, the rotating device further includes an angle measuring device coupled to the rotator and configured to measure the rotation angle.

In some embodiments, the calculator is coupled to the angle measuring device.

In some embodiments, the calculator includes a first multiplier configured to calculate a first product of the projection distance and a focal length of a lens of the camera, a tangent function calculator configured to calculate a tangent function of the rotation angle, a second multiplier configured to calculate a second product of the tangent function of the rotation angle and the focal length of the lens, a subtractor configured to calculate a difference value between the projection distance and the second product, and a divider configured to divide the first product by the difference value to obtain the target distance.

In some embodiments, a focal point of a lens of the camera is located at the center point of the photo sensor.

In some embodiments, the rotating device further includes an object determining module configured to obtain an image captured by the camera, detect objects in the image, and select the target from the objects.

In some embodiments, the object determining module includes an analyzing unit configured to obtain features of the objects, compare the features of the objects with a preset feature, and determine the target according to whether the features match the preset feature.

In another aspect, the present disclosure provides an imaging device including a camera including a photo sensor and a lens and configured to capture an unaligned target image and an aligned target image of a target, and a rotator configured to drive the camera to rotate along a rotation axis. A projection of the unaligned target image on a reference plane does not overlap with a projection of a center point of the photo sensor on the reference plane. A projection of the aligned target image on the reference plane overlaps with the projection of the center point. The reference plane is perpendicular to a rotation axis of the camera.

In another aspect, the present disclosure provides a distance measuring method for measuring a target distance between a target and a camera. The method includes rotating the camera along a rotation axis to capture an unaligned target image and an aligned target image. A projection of the unaligned target image on a reference plane does not overlap with a projection of a center point of a photo sensor of the camera on the reference plane. A projection of the aligned target image on the reference plane overlaps with the projection of the center point. The reference plane is perpendicular to the rotation axis. The method further includes measuring a projection distance between the projection of the unaligned target image and the projection of the center point of the photo sensor, measuring a rotation angle of the camera between an unaligned position at which the camera captures the unaligned target image and an aligned position at which the camera captures the aligned target image, and calculating the target distance based on the projection distance and the rotation angle.

In some embodiments, rotating the camera to capture the unaligned target image and the aligned target image includes capturing target images of the target during the rotation, detecting a position of a projection of each of the target images on the reference plane, and controlling the camera to stop rotating when the projection of one of the target images overlaps with the projection of the center point of the photo sensor.

In some embodiments, rotating the camera to capture the unaligned target image and the aligned target image includes continuously rotating the camera for a time period after capturing the aligned target image.

In some embodiments, rotating the camera to capture the unaligned target image and the aligned target image includes obtaining a positional relationship between the target and the camera, determining a rotation direction for the camera based on the positional relationship, and rotating the camera according to the rotation direction.

In some embodiments, the target distance is calculated according to $$L = \frac{xf}{x - f\tan\theta},$$

where L represents the target distance, x represents the projection distance, θ represents the rotation angle, and f represents a focal length of the lens.

In some embodiments, a focal point of the lens is located at the center point of the photo sensor.

In some embodiments, the distance measuring method further includes capturing an image by the camera, detecting objects in the image, and selecting the target from the objects.

In some embodiments, selecting the target from the objects includes obtaining features of the objects, comparing the features of the objects with a preset feature, and determining the target according to whether the features match the preset feature.

BRIEF DESCRIPTION OF THE FIGURES

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are described in connection with the accompanying drawings. In the disclosure, unless otherwise specified, same reference numbers refer to same or similar parts. Shapes and sizes of blocks in the drawings representing components according to the disclosure do not reflect the actual proportions of the components. It should be understood that the exemplary embodiments described herein are only intended to illustrate and explain the present disclosure and not intended to limit the scope of the present disclosure. Other applications, advantages, alternations, modifications, or equivalents of the disclosed embodiments are obvious to those skilled in the art and are intended to be included within the scope of the present disclosure.

To at least partially solve the problems in a conventional distance measuring system, e.g., requiring two cameras, being costly, and being bulky, the present disclosure provides a distance measuring system that uses one camera to measure the distance between an object and the distance measuring system. The disclosed distance measuring system can be less costly, have a reduced volume, and be easier to use and carry.

Figure 1:
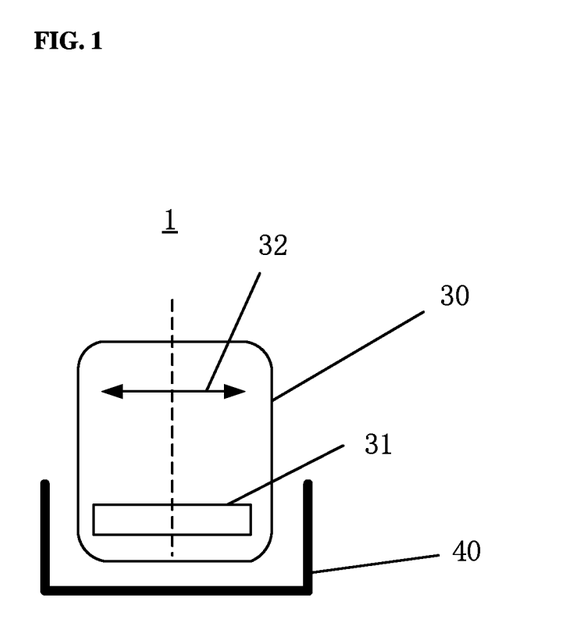
FIG. 1 illustrates a schematic view of an exemplary imaging device according to various disclosed embodiments.

FIG. 1 schematically illustrates an exemplary imaging device 1 according to the present disclosure. The imaging device 1 can be configured as a distance measuring system that can measure the distance between a target and the imaging device 1. As shown in FIG. 1, the imaging device 1 includes a camera 30 and a rotator 40. The camera 30 includes a photo sensor 31 and a lens 32. The lens 32 can include a single lens or a lens group. The rotator 40 is configured to drive the camera 30 to rotate along a rotation axis between a first position and a second position. The rotation of the camera 30 will be described in more detail below in connection with FIG. 2.

In one embodiment, the rotator 40 may be configured to carry the camera 30. That is, the camera 30 may be mounted in or on the rotator 40. In some embodiments, the camera 30 may be removably mounted in or on the rotator 40 such that different cameras may be mounted in or on the rotator 40 for different purposes.

According to the present disclosure, one camera is used to measure the distance between the target and the imaging device 1. Thus, the imaging device 1 can be less costly and smaller. It can be easier to carry and use the imaging device 1.

In one embodiment, the photo sensor 31 may include a charge-coupled device (CCD) photo sensor. In other embodiments, the photo sensor 31 may include another appropriate photo sensor. A center of the photo sensor 31 may refer to a center of an image plane on the photo sensor 31, i.e., the point at which an optical axis of the lens 32 crosses the image plane. During actual use, the target is usually located relatively far away from the imaging device 1, and thus the image plane of the photo sensor 31 approximately overlaps with the focal plane of the lens 32, i.e., the distance between the lens 32 and the photo sensor 31 approximately equals the focal length, f, of the lens 32. The rotation axis may refer to a line that lies on the image plane of the photo sensor 31 and passes through the center of the photo sensor 31.

The first position and the second position do not indicate a specific order, but to distinguish the two different positions. The rotator 40 can drive the camera 30 to rotate from the first position to the second position, in which scenario the first and second positions are the initial and final positions of the rotation, respectively, or drive the camera 30 to rotate from the second position to the first position, in which scenario the first and second positions are the final and initial positions of the rotation, respectively.

The operating principles of using one camera to measure the distance between the target and the distance measuring system, e.g., the imaging device 1, will be described in detail below in connection with FIGS. 2(*a*) and 2(*b*). For illustrative purposes, in the present disclosure, the image of the target, formed on the photo sensor 31, is also referred to as a "target image."

Figure 2A:
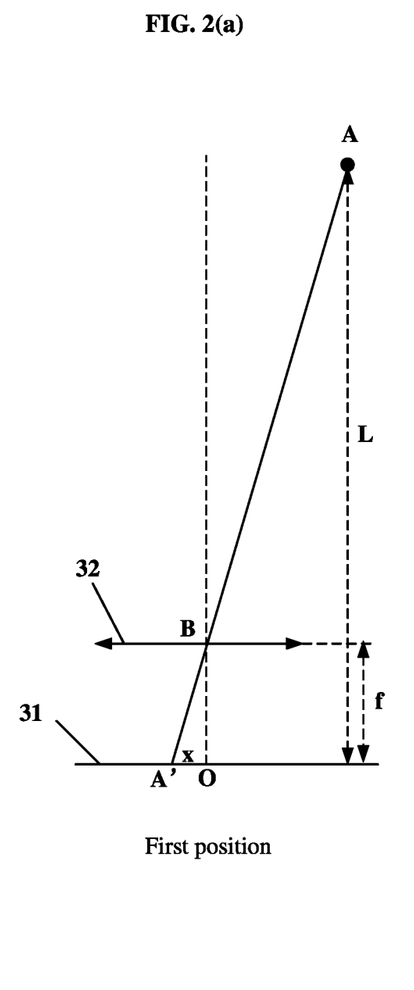
FIG. 2 illustrates operating principles of using one camera to measure a distance between an object and the imaging device.
Figure 2B:
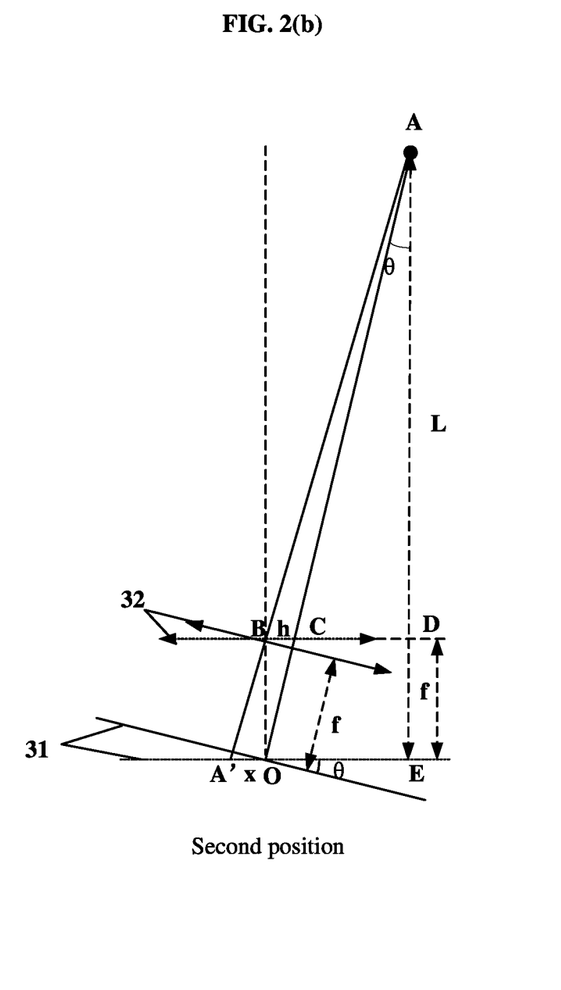

FIGS. 2(*a*) and 2(*b*) schematically show the status of the photo sensor 31 and the lens 32 when the camera 30 is in the first position (as in FIG. 2(*a*)) and when the camera 30 is in the second position (as in FIG. 2(*b*)). Driven by the rotator 40 (not shown in FIGS. 2(*a*) and 2(*b*)), the camera 30 can rotate between the first position and the second position about the rotation axis. As described above, the rotation axis may be a line passing through the center point of the photo sensor 31.

Hereinafter, the operation of the imaging device 1 will be described with respect to a reference plane shown in FIGS. 2(*a*) and 2(*b*), which is a plane perpendicular to the rotation axis and the image plane. For example, the reference plane can be a plane passing through the center point of the photo sensor 31 and perpendicular to the rotation axis and the image plane, in which scenario the projection of the center point on the reference plane coincides with the center point itself. In the illustration shown in FIGS. 2(*a*) and 2(*b*), the reference plane is a horizontal plane parallel to a surface of the drawing sheet and can also be referred to as being parallel to the drawing sheet. Correspondingly, the rotation axis of the camera 30 can be referred to as being perpendicular to the drawing sheet.

In FIGS. 2(*a*) and 2(*b*), components, such as the photo sensor 31 and the lens 32, and various spatial points are represented by their projections on the reference plane. In the description below, unless otherwise specified, each of the capital letters A, A', B, D, E, and O in FIGS. 2(*a*) and 2(*b*) represents the projection of an associated spatial point or an object on the reference plane and a term including one of the capital letters A, A', B, D, E, and O can refer to the projection of the associated spatial point or the object on the reference plane. For example, the term "target A" refers to the projection of the target on the reference plane. In some scenarios, a spatial point or object can fall on the reference plane and thus overlaps with the projection of the spatial point or object.

The distance between the target and the imaging device 1 can be represented by a distance between the target A and the photo sensor 31, i.e., the length L of line segment AE in FIGS. 2(*a*) and 2(*b*), where line segment AE is perpendicular to the projection of the photo sensor 31 when the camera 30 is at the first position. As shown in FIGS. 2(*a*) and 2(*b*), the focal length f of the lens 32 may equal to the distance between a center point B of the lens 32 and the center point O of the photo sensor 31.

In FIGS. 2(*a*) and 2(*b*), point A' is a point on the reference plane representing the projection of an image of the target, i.e., the target image, formed on the photo sensor 31 when the camera 30 is at the first position. Generally, an image formed on the photo sensor 31 may enclose an area or image area. In one embodiment, the target image formed on the photo sensor 31 may be considered a point for illustrative purposes. This point may be the center point of the image area, a point in the center region of the image area, or any suitable point in the image area. As shown in FIG. 2(*a*), point A' does not coincide with the center point O of the photo sensor 31, and is separated from the center point O by a distance x. Therefore, the first position is also referred to as an "unaligned position," and the target image formed when the camera is at the unaligned position is also referred to as an "unaligned target image."

Referring to FIG. 2(*b*), when the camera 30 is at the second position, the projection of the image of the target A coincides with the center point O. Therefore, the second position is also referred to as an "aligned position," and the target image formed when the camera is at the aligned position is also referred to as an "aligned target image." As described above, the camera 30 can rotate from the first position to the second position or from the second position to the first position. The rotation angle is represented by θ as shown in FIG. 2(*b*).

As shown in FIG. 2(*b*), a line (the upper one of the two horizontal dotted lines in FIG. 2(*b*)), on which the projection of the lens 32 lies when the camera 30 is at the first position, intersects with line segment AO at a point C. Line segment AE is a perpendicular connection line segment between point A and a line (the lower one of the two horizontal dotted lines in FIG. 2(*b*)) formed by the intersection between the image plane of the photo sensor 31 and the reference plane when the camera 30 is at the first position. Line segment BC extends and intersects with line segment AE at a point D.

As labeled in FIG. 2(*b*), line segment BC has a length h, line segment A'O has a length x (the distance x mentioned above), line segment DE has a length approximately equaling the focal length f of the lens 32, and line segment AE has a length L. Triangles ΔAA'O and ΔABC are similar triangles. According to the principle of similar triangles, equation (1) can be obtained:

$$\frac{AO}{AC} = \frac{A'O}{BC} = \frac{x}{h} \quad (1)$$

Triangles ΔACD and ΔAOE are similar triangles. According to the principle of similar triangles, equation (2) can be obtained:

$$\frac{AO}{AC} = \frac{AE}{AD} = \frac{L}{L-f} \quad (2)$$

Combining equations (2) and (3), equation (3) can be obtained:

$$\frac{L}{L-f} = \frac{x}{h} \quad (3)$$

Because h=f tan θ, equation (4) can be obtained:

$$\frac{L}{L-f} = \frac{x}{h} = \frac{x}{f\tan\theta} \quad (4)$$

Thus, equation (5) can be obtained:

$$L = \frac{xf}{\tan\theta} \quad (5)$$

As shown above, the distance L between the camera 30 and the target can be calculated based on the position of the target image on the photo sensor 31 and the rotation angle θ between the first position and the second position. The rotation angle θ refers to the angle that the camera 30 rotates between the first position and the second position.

In the embodiments described above, the distance between the camera 30 and the target refers to the vertical distance between the projection of the target on the reference plane and the photo sensor 31, i.e., the distance between the image plane of the photo sensor 31 and a plane passing through the target and parallel to the image plane. In other embodiments, the distance between the camera 30 and the target may refer to the vertical distance between the projection of the target on the reference plane and the lens 32, i.e., L–f in FIG. 2(b).

In the embodiments described above, the reference plane is a horizontal plane (parallel to the drawing sheet). In other embodiments, the reference plane may be a plane perpendicular to the horizontal plane or another suitable inclined plane. In these embodiments, the process to determine the distance L is similar to the process described above, and is not repeated herein.

Figure 3:
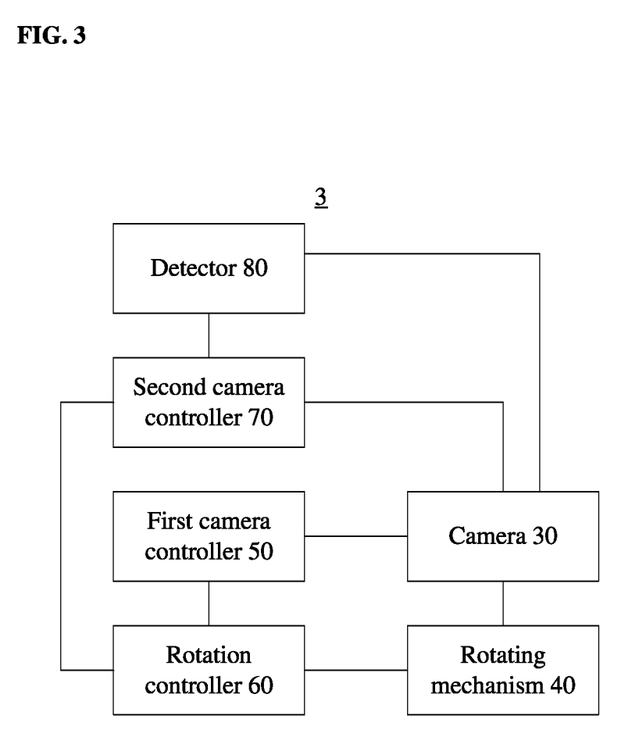
FIG. 3 illustrates an exemplary block diagram of another exemplary imaging device according to various disclosed embodiments.

FIG. 3 illustrates the block diagram of an exemplary imaging device 3 according to the present disclosure. As shown in FIG. 3, the imaging device 3 includes the camera 30, the rotator 40, a first camera controller 50, a rotation controller 60, a second camera controller 70, and a detector 80. In this example, the first position may be the initial position and the second position may be the position after the rotation.

The camera 30 includes the photo sensor 31 (not shown in FIG. 3) and the lens 32 (not shown in FIG. 3).

The rotator 40 is configured to drive the camera 30 to rotate about the rotation axis that passes through the center of the photo sensor, between the first position and the second position. When the camera 30 is at the second position, the target image, formed on the photo sensor, may have a projection on the reference plane. The projection may overlap with or be at the same location as the projection of the center point of the photo sensor on the reference plane. The reference plane may be perpendicular to the rotation axis.

The first camera controller 50 is coupled to the camera 30 to control the camera 30 to capture a first image when the camera 30 is at the first position. In the present disclosure, the first image that is taken when the camera 30 is at the first position is also referred to as an "unaligned image."

The rotation controller 60 is coupled to the first camera controller 50 and the rotator 40. After the first camera controller 50 controls the camera 30 to capture the first image, the rotation controller 60 may control the rotator 40 to drive the camera 30 to rotate about the rotation axis that passes through the center of the photo sensor in the rotation plane.

The second camera controller 70 is coupled to the camera 30 and the rotation controller 60. The second camera controller 70 is configured to control the camera 30 to capture images during the rotation of the camera 30.

The detector 80 is coupled to the camera 30 and the second camera controller 70. Based on the images captured by the camera 30 during the rotation, the detector 80 may detect whether the projection of a target image on the reference plane overlaps with or is at the same location as the projection of the center point of the photo sensor on the reference plane. When the detector 80 detects that the projection of the target image overlaps with or is at the same location as the projection of the center point of the photo sensor on the reference plane, the detector 80 may control an angle measuring device (not shown) to measure the angle between the first position and the second position, i.e., the angle for which the camera 30 rotates from the first position to the second position.

In one embodiment, when the detector 80 detects that the projection of the target image on the reference plane overlaps with or is at the same location as the projection of the center point of the photo sensor on the reference plane, the detector 80 may send proper signals to the rotation controller 60 such that the rotation controller 60 may control the rotator 40 to stop rotating.

Examples are now described below to illustrates how the detector 80 detects that the camera 30 rotates to the second position.

In one embodiment, the reference plane may be assumed to be a horizontal plane (parallel to the drawing sheets) and may pass through the center point of the photo sensor.

In one embodiment, when the camera 30 is rotated, the camera 30 may continuously capture images. The camera 30 may retrieve the captured images and may compare an X coordinate of a target image on the photo sensor with the X coordinate of the center point of the photo sensor. When the X coordinate of the target image on the photo sensor is the same as the X coordinate of the center point of the photo sensor, the imaging device 3 may determine that the projection of the target image on the reference plane overlaps with or is at the same location as the projection of the center point of the photo sensor on the projection plane. That is, the camera 30 has been rotated to the second position. Thus, the imaging device 3 may send proper signals to the rotation controller 60 to control the rotator 40 to stop rotating. Meanwhile, the angle measuring device may obtain the rotation angle between the first position and the second position.

Figure 4:
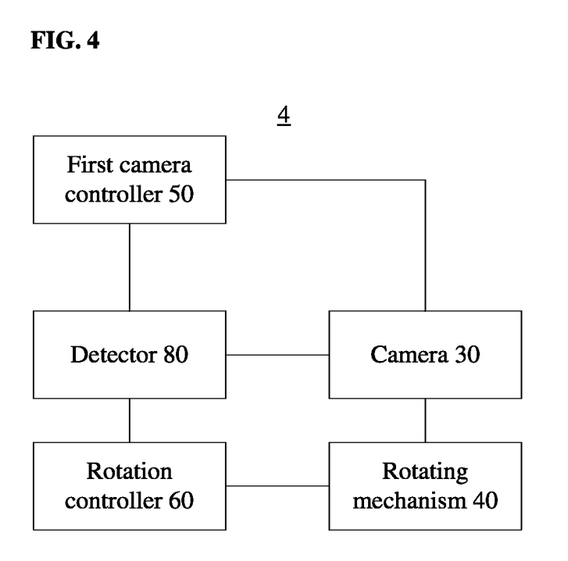
FIG. 4 illustrates an exemplary block diagram of another exemplary imaging device according to various disclosed embodiments.

FIG. 4 illustrates a block diagram of another exemplary imaging device 4 according to the present disclosure. As shown in FIG. 4, the imaging device 4 includes the camera 30, the rotator 40, the first camera controller 50, the rotation controller 60, and the detector 80. In the imaging device 4 shown in FIG. 4, the second position may be the initial position and the first position may be the position after the rotation.

The camera 30 includes the photo sensor 31 (not shown in FIG. 4) and the lens 32 (not shown in FIG. 4).

The rotator 40 is configured to drive the camera 30 to rotate about the rotation axis that passes through the center of the photo sensor between the first position and the second position in the rotation plane. When the camera 30 is at the second position, the projection of the target image on the reference plane may overlap with or may be at the same location as the projection of the center point of the photo sensor on the reference plane. The reference plane may be perpendicular to the rotation axis.

The rotation controller 60 is coupled to the rotator 40. When the camera 30 is at the second position, the rotation controller 60 may control the rotator 40 to drive the camera 30 to rotate about the rotation axis that passes through the center of the photo sensor in the rotation plane.

The detector 80 is coupled to the rotation controller 60. The detector 80 may control an angle measuring device (not shown) to measure the angle between the first position and the second position after the rotation controller 60 controls the rotator 40 to rotate for a time period. At this moment, the camera 30 may be at the first position.

The first camera controller 50 is coupled to the camera 30 and the detector 80. When the camera 30 is at the first position, the first camera controller 50 may control the camera 30 to capture a first image.

In some embodiments, the detector 80 may also send proper signals to the rotation controller 60 to stop the rotator 40 from rotating, after the rotation controller 60 controls the rotator 40 to rotate for the time period.

When the second position is the initial position, the rotator 40 may rotate for the time period to a position, which can be the first position. The time period may be a set or a fixed time period, or a randomly determined time period. It may be desired that the target is within the imaging area of the camera 30 when the camera 30 is at the first position.

When the camera 30 rotates about the rotation axis that passes through the center point of the photo sensor in the rotation plane, the camera 30 may rotate in two directions, i.e., a clockwise direction and a counter clockwise direction. When the rotation controller 60 is not able to determine the positional relationship between the target and the photo sensor, the rotation controller 60 may not be able to determine a correct rotation direction for the camera 30.

Thus, in one embodiment, the rotation controller 60 may include a direction determining module. The direction determining module may be coupled to the rotator 40 to obtain the positional relationship between the target and the camera 30. Based on the positional relationship, the direction determining module may determine in which direction, i.e., the clockwise direction or the counter clockwise direction, the camera 30 may rotate. Based on the rotation direction, the direction determining module may control the rotator 40 to drive the camera 30 to rotate about the rotation axis that passes through the center point of the photo sensor.

In other embodiments, the rotation controller 60 does not include the direction determining module. The rotation controller 60 may select a random direction for the camera 30 to rotate, and perform calculation to determine whether the projection of the target image on the reference plane is gradually approaching the projection of the center point of the photo sensor on the projection plane. If the rotation controller 60 determines that the projection of the target image is gradually approaching the projection of the center point of the photo sensor on the projection plane, the rotation controller 60 may determine the rotation direction is correct. If the rotation controller 60 determines that the projection of the target image is not gradually approaching the projection of the center point of the photo sensor on the projection plane, the rotation controller 60 may determine the rotation direction is not correct. Accordingly, the rotation controller 60 may change the rotation direction of the camera 30.

Examples of the method for calculating the distance between the target and the camera 30 are consistent with the operating principles described above in connection with FIGS. 2(*a*) and 2(*b*), and are thus not repeated here.

Figure 5:
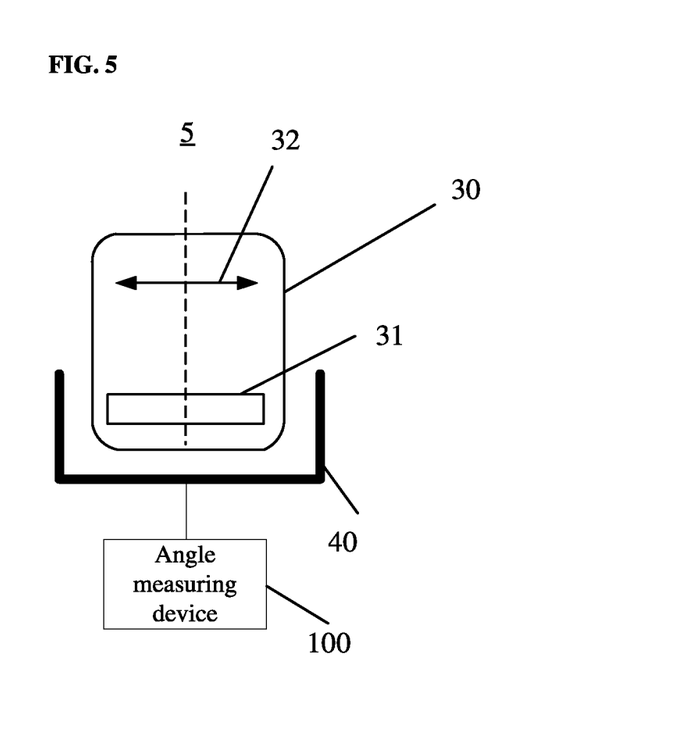
FIG. 5 illustrates a schematic view of another exemplary imaging device according to various disclosed embodiments.

FIG. 5 illustrates a schematic view of another exemplary imaging device 5 according to the present disclosure. The imaging device 5 includes the camera 30, the rotator 40, and an angle measuring device 100. The angle measuring device 100 is coupled to the rotator 40 to measure the angle that the rotator 40 rotates to obtain the rotation angle θ, which is the angle the camera 30 rotates between the first position and the second position.

Figure 6:
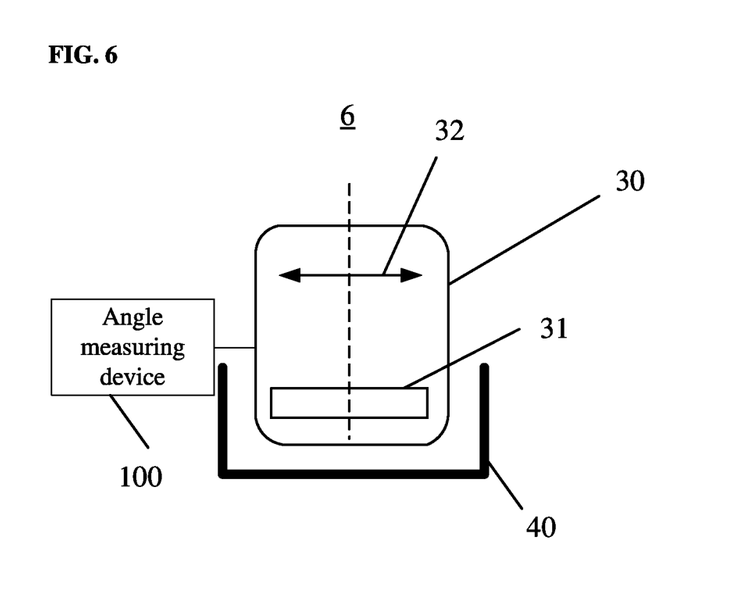
FIG. 6 illustrates a schematic view of another exemplary imaging device according to various disclosed embodiments.

FIG. 6 illustrates a schematic view of another exemplary imaging device 6 according to the present disclosure. The imaging device 6 is similar to the imaging device 5, except that in the imaging device 6, the angle measuring device 100 is coupled to the camera 30 to directly measure the rotation angle θ the camera 30 rotates between the first position and the second position.

Figure 7:
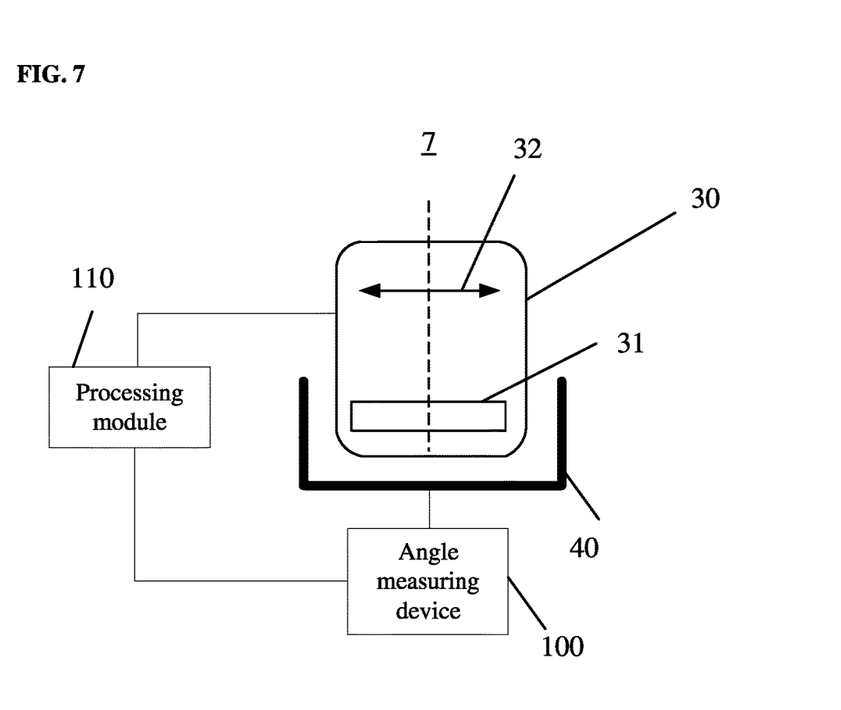
FIG. 7 illustrates a schematic view of another exemplary imaging device according to various disclosed embodiments.

FIG. 7 illustrates a schematic view of another exemplary imaging device 7 according to the present disclosure. The imaging device 7 is similar to the imaging device 5 shown in FIG. 5, except that the imaging device 7 further includes a processing module 110. The processing module 110 is coupled to the camera 30 and the angle measuring device 100 to obtain the first image captured by the camera 30 when the camera 30 is at the first position. Based on the first image, the processing module 110 may obtain a distance x between the location of the projection of the target image on the reference plane and the projection of the center point of the photo sensor 31 on the projection plane. The processing module 110 may further obtain the rotation angle θ that the camera 30 rotates between the first position and the second position. Based on the distance x and the rotation angle θ, the processing module 110 may calculate the distance between the target and the camera 30.

The processing module 110 may include, for example, a microprocessor, a digital signal processor, a microcontroller, or an application specific integrated circuit (ASIC). The processing module 110 may execute sequences of computer program instructions to perform various processes associated with an imaging device consistent with the present disclosure. Computer program instructions may be loaded in a non-transitory computer-readable storage medium for execution by the processing module 110. The storage medium may include any appropriate type of mass storage provided to store any type of information that processing module 110 may need to perform the processes. For example, the storage may include one or more hard disk devices, optical disk devices, flash disks, or other storage devices to provide storage space.

Figure 8:
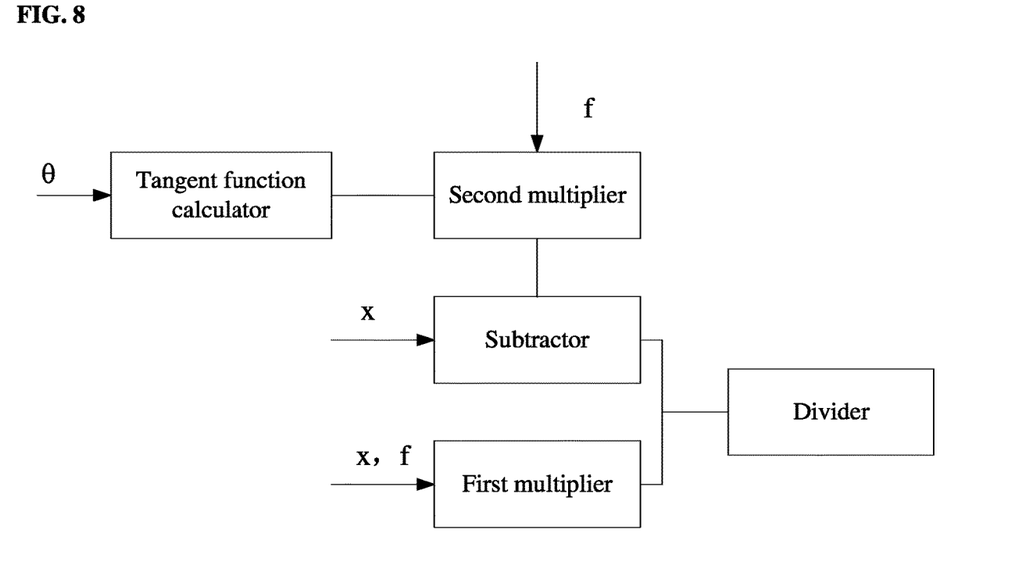
FIG. 8 illustrates an exemplary block diagram of a processing module of an exemplary imaging device according to various disclosed embodiments.

FIG. 8 illustrates a schematic view of a processing module 110 of an exemplary imaging device according to the present disclosure. As shown in FIG. 8, in one embodiment, the processing module 110 includes a first multiplier, a tangent function calculator, a second multiplier, a subtractor, and a divider.

The first multiplier is configured to calculate a first product of the distance x and the focal length f of the lens 32.

The tangent function calculator is configured to calculate the tangent function of θ.

The second multiplier is configured to calculate a second product of the tangent function of θ and the focal length f of the lens 32.

The subtractor is configured to subtract the second product from the distance x to obtain a difference value.

The divider is configured to divide the first product by the difference value to obtain the distance between the target and the camera 30.

In certain embodiments, the processing module may be configured in an external computing device, such as a computer, to calculate the distance between the target and the camera 30. In some other embodiments, the processing module may be integrated in the imaging device.

In another embodiment, the imaging device may include a display module (not shown). The display module may be coupled to the processing module 110 to display the distance between the target and the camera 30 calculated by the processing module 110. Thus, the calculation result may be displayed immediately without the use of any other display devices.

The display module may provide information to a user or users of the imaging device. The display module may include any appropriate type of computer display device or electronic device display (e.g., CRT or LCD based devices). The imaging device may further include an input/output interface for users to input information into the imaging device or for the users to receive information from the imaging device. For example, the input/output interface may include any appropriate input device, such as a keyboard, a mouse, an electronic tablet, voice communication devices, touch screens, or any other optical or wireless input devices. Further, the input/output interface may receive information from and/or send information to other external devices.

Further, the imaging device may include a database, such as any type of commercial or customized database, and may also include analysis tools for analyzing information in the database. The database may be used for storing information obtained from the calculation of the distance between the target and the camera 30 and other related information. Further, the imaging device may include a communication interface to provide communication connections such that the imaging device may be accessed remotely and/or communicate with other systems through computer networks or other communication networks via various communication protocols, such as transmission control protocol/internet protocol (TCP/IP), hypertext transfer protocol (HTTP), etc.

The processing module 110 may be coupled to the database, the storages, the display module, the input/output interface, and the communication interface to perform any calculation required for determining the distance between the target and the camera 30.

For illustrative purposes, in the described embodiments, the focal point of the lens 32 may be at the center point of the photo sensor 31.

In certain embodiments, the camera 30 may capture an image that includes a plurality of objects. The imaging device may select the target from the plurality of objects to measure the distance between the target and the camera 30.

In one embodiment, the imaging device may also include an object determining module. The object determining module may be coupled to the camera 30 to obtain images captured by the camera 30 and detect whether an image includes a plurality of objects. When a plurality of objects is detected, the object determining module may select the target from the plurality of objects.

Specifically, in one embodiment, the object determining module may include an analyzing unit. The analyzing unit may be used to detect the features of objects in an image when the image includes a plurality of objects. When the features of an object, currently detected, match the features of a previously-stored target, the analyzing unit may determine the object that is currently detected as the target.

In another embodiment, the camera 30 may include a display. The display is configured to display the images captured by the camera 30. Further, the object determining module may obtain the images captured by the camera 30 and detect whether an image includes a plurality of objects. When the object determining module detects that the image includes a plurality of objects, the plurality of objects may be labeled in the display. The object determining module may receive the user's instruction to select the target from the labeled objects.

In one embodiment, the display may be a touch display to allow the user to select the target from the plurality of the labeled objects by touching the display screen.

The present disclosure also provides a rotating device. The rotating device may be coupled to a camera to measure the distance between a target and the camera. The camera may include a photo sensor and a lens, where the lens can include a single lens or a lens group.

The rotating device may include a rotator. The rotator may drive the camera to rotate about the rotation axis that passes through the center point of the photo sensor. The camera may be driven to rotate between a first position and a second position. When the camera is at the second position, the projection of the target image on the reference plane may overlap with or may be located at the same location as the projection of the center point of the photo sensor on the projection plane. The projection plane may be perpendicular to the rotation axis.

In one embodiment, the reference plane may be a horizontal plane (parallel to the drawing sheet), and may pass through the center point of the photo sensor.

The position of the image formed on the photo sensor when the camera is at the first position, and the rotation angle $\theta$ that the camera rotates between the first position and the second position may be used to calculate a distance between the camera and the target.

In one embodiment, the first position may be the initial position of the camera, and the second position may be the position of the camera after rotation. The rotator may include a first camera controller, a rotation controller, a second camera controller, and a detector.

The first camera controller may be coupled to the camera to control the camera to capture a first image when the camera is at the first position.

The rotation controller may be coupled to the first camera controller and the rotator. After the first camera controller controls the camera to capture the first image, the rotation controller may control the rotator to drive the camera to rotate about the rotation axis that passes through the center of the photo sensor in the rotation plane.

The second camera controller may be coupled to the camera and the rotation controller. The second camera controller may control the camera to capture images during the rotation of the camera.

The detector may be coupled to the camera and the second camera controller. Based on the images captured by the camera during the rotation, the detector may detect whether the projection of a target image, formed on the photo sensor, overlaps with or is at the same location as the projection of the center point of the photo sensor, on the projection plane. When the detector detects that the projection of the target image overlaps with or is at the same location as the projection of the center point of the photo sensor on the projection plane, the detector may control an angle measuring device to measure the angle between the first position and the second position.

In one embodiment, when the detector detects that the projection of the target image on the reference plane overlaps with or is at the same location as the projection of the center point of the photo sensor on the projection plane, the detector may send proper signals to the rotation controller such that the rotation controller may control the rotator to stop rotating.

In some embodiments, the second position may be the initial position and the first position may be the position after the rotation. The imaging device may include a rotation controller, a detector, and a first camera controller.

The rotation controller may be coupled to the rotator. When the camera is at the second position, the rotation controller may control the rotator to drive the camera to rotate about the rotation axis that passes through the center of the photo sensor.

The detector may be coupled to the rotation controller. The detector may control an angle measuring device to measure the angle between the first position and the second position after the rotation controller controls the rotator to rotate for a time period. At this moment, the camera may be at the first position.

The first camera controller may be coupled to the camera and the detector. When the camera is at the first position, the first camera controller may control the camera to capture a first image.

In some embodiments, the detector may also send proper signals to the rotation controller to stop the rotator from rotating, after the rotation controller controls the rotator to rotate for the time period.

In one embodiment, the rotation controller may include a direction determining module. The direction determining module may be coupled to the rotator to obtain the positional relationship between the target and the camera. Based on the positional relationship, the direction determining module may determine which direction the camera may rotate. Based on the rotation direction, the direction determining module may control the rotator to drive the camera to rotate in that rotation direction about the rotation axis that passes through the center point of the photo sensor.

In one embodiment, the imaging device may further include an angle measuring device. The angle measuring device may be connected to the rotator to measure the angle the rotator rotates to obtain the rotation angle θ, which is the angle the camera rotates between the first position and the second position.

In some embodiments, the imaging device may further include a processing module. The processing module may be coupled to the camera and the angle measuring device to obtain the first image captured by the camera when the camera is at the first position. Based on the first image, the processing module may obtain a distance x between the location of the projection of the target image on the reference plane and the projection of the center point of the photo sensor on the reference plane. The processing module may further obtain the rotation angle θ that the camera rotates between the first position and the second position. Based on the distance x and the rotation angle θ, the processing module may calculate the distance between the target and the camera.

In one embodiment, the processing module may include a first multiplier, a tangent function calculator, a second multiplier, a subtractor, and a divider.

The first multiplier may be used to calculate a first product of a distance x and the focal length f of the lens.

The tangent function calculator may be used to calculate the tangent function of θ.

The second multiplier may be used to calculate a second product of the tangent function of θ and the focal length f of the lens.

The subtractor may be used to subtract the second product from the distance x to obtain a difference value.

The divider may be used to divide the first product by the difference value to obtain the distance between the target and the camera.

In one embodiment, the imaging device may also include an object determining module. The object determining module may be coupled to the camera to obtain images captured by the camera and detect whether an image includes a plurality of objects. When a plurality of objects is detected, the object determining module may select the target from the plurality of objects.

Specifically, in one embodiment, the object determining module may include an analyzing unit. The analyzing unit may be configured to detect the features of objects in the image when the image includes a plurality of objects. When the features of an object, currently detected, match the features of a previously-stored target, the analyzing unit may determine the object that is currently detected as the target.

Figure 9:
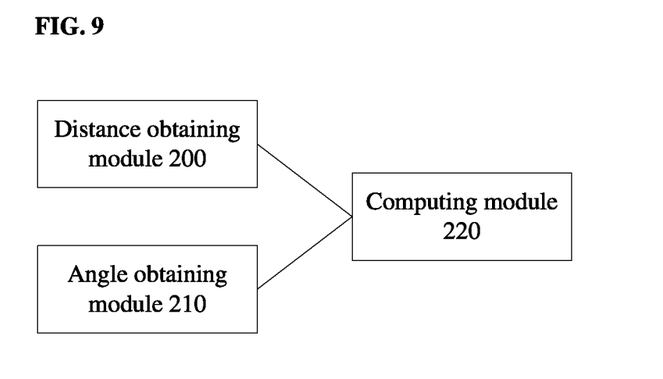
FIG. 9 illustrates a schematic view of an exemplary distance measuring device according to various disclosed embodiments.

Another aspect of the present disclosure provides a distance measuring device. FIG. 9 illustrates a schematic view of an exemplary distance measuring device 9 according to the present disclosure. The distance measuring device 9 may be coupled with an imaging device consistent with the present disclosure, such as one of the above-described exemplary imaging devices, to measure a distance between a target and a camera of the imaging device. As shown in FIG. 9, the distance measuring device 9 includes a distance obtaining module 200, an angle obtaining module 210, and a computing module 220.

The distance obtaining module 200 is configured to obtain a first image when the camera is at a first position, i.e., an unaligned position. Based on the first image, the distance obtaining module 200 may obtain a distance x between the projection of the target image on a reference plane and the projection of the center point of the photo sensor on the reference plane. The reference plane is perpendicular to a rotation axis of the camera that passes through the center point of the photo sensor, as described above.

The angle obtaining module 210 is configured to obtain a rotation angle θ that the camera rotates between the first position and a second position, about the rotation axis. When the camera is at the second position, the projection of a target image on the reference plane may overlap with or may be at the same location as the projection of the center point of the photo sensor on the reference plane.

The computing module 220 is coupled to the distance obtaining module 200 and the angle obtaining module 210 to calculate the distance between the target and the camera based on the distance x and the rotation angle θ.

A distance measuring device consistent with the present disclosure, such as the distance measuring device 9, may be coupled with a camera to measure the distance between a target and the camera. Thus, the distance measuring system may be less costly and the volume of the distance measuring system may be reduced. It may be easier to use and carry the disclosed distance measuring system.

In one embodiment, the computing module 220 may include a first multiplier, a tangent function calculator, a second multiplier, a subtractor, and a divider.

The first multiplier may be configured to calculate a first product of the distance x and the focal length f. The distance x may be a distance between the projection of the target image formed on the photo sensor and the projection of the center point of the photo sensor, on the projection plane. The focal length f may be the focal length of a lens of the camera.

The tangent function calculator may be configured to calculate the tangent function of θ.

The second multiplier may be configured to calculate a second product of the tangent function of θ and the focal length f of the camera lens.

The subtractor may be configured to subtract the second product from the distance x to obtain a difference value.

The divider may be configured to divide the first product by the difference value to obtain the distance between the target and the camera.

According to the present disclosure, an imaging device consistent with the present disclosure can include the camera 30, the rotator 40, and a processor. The processor can be coupled to at least one of the camera 30 or the rotator 40, and is configured to perform a method consistent with the present disclosure. The processor can include one or more of the above-described first camera controller 50, rotation controller 60, second camera controller 70, detector 80, or processing module 110. The imaging device can further include a non-transitory computer-readable storage medium storing instructions that, when executed by the processor, cause the processor to perform a method consistent with the present disclosure, such as the processes performed by one or more of the above-described first camera controller 50, rotation controller 60, second camera controller 70, detector 80, or processing module 110.

The present disclosure also provides a distance measuring system. The distance measuring system may include a distance measuring device and an imaging device. The distance measuring device may be a disclosed distance measuring device, and the imaging device may be a disclosed imaging device.

The present disclosure also provides an application system including a distance measuring system consistent with the present disclosure, a controller coupled to the distance measuring system, and an output device coupled to the controller. The distance measuring system is configured to measure a distance of a target to the distance measuring system according to the present disclosure, and output the measurement results to the controller. The controller is configured to process the distance measurement results and control the output device according to the distance measurement results.

In some embodiments, the application system includes smart appliance. The controller is further configured to control the smart appliance according to the distance measurement results. For example, the smart appliance includes a smart light. The controller is configured to control the smart light to turn on when the distance measuring system outputs a measured distance indicating a user is within a certain distance, or to turn off when the distance measuring system does not output a measured distance or outputs a measured distance indicating the user is outside of the certain distance.

In some embodiments, the application system includes an alarm system, which can be installed, for example, in a garage or at a doorway for monitoring purposes. In the alarm system, the output device includes an alarm, such as a sound alarm or a light alarm, coupled to the controller. The controller is further configured to trigger the alarm if an object, such as an unauthorized trespasser, is within a certain distance as measured by the distance measuring system consistent with the present disclosure.

In some embodiments, the application system includes an entertainment system, such as a gaming system. In some embodiments, the output device includes a display, such as an LCD display or a touch panel display, and is configured to display an image or a video including the target according to the distance measured by the distance measuring system consistent with the present disclosure.

Figure 10:
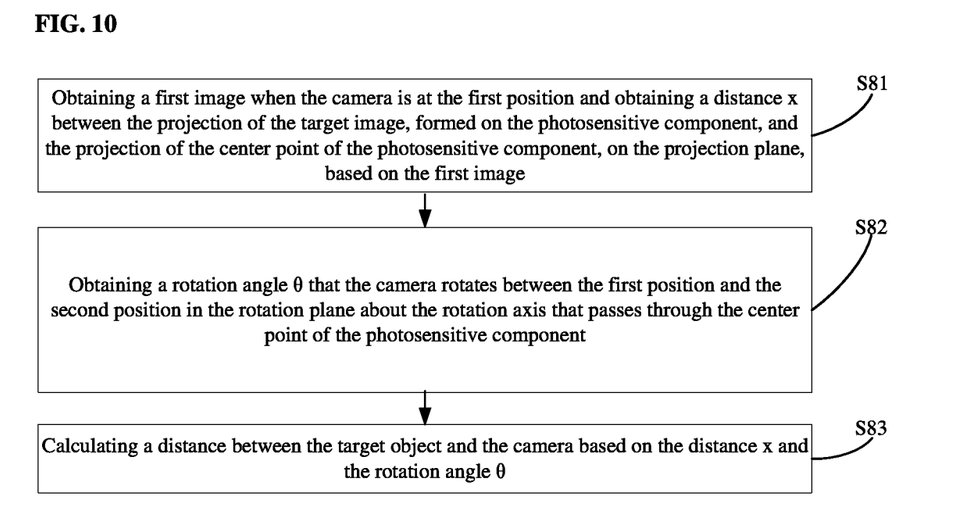
FIG. 10 illustrates an exemplary flow chart of a distance measuring method for an exemplary distance measuring device according to various disclosed embodiments.

The present disclosure also provides a distance measuring method. FIG. 10 illustrates a flow chart of an exemplary distance measuring method according to the present disclosure. The method can be implemented to measure the distance between a camera and a target. The camera includes a photo sensor and a lens. The lens can be a single lens or a lens group. As shown in FIG. 10, at S81, a first image is obtained when the camera is at a first position. A distance x between a projection of a target image of the target on a reference plane and a projection of a center point of the photo sensor on the reference plane is obtained based on the first image. The reference plane may be perpendicular to a rotation axis about which the camera rotates.

At S82, a rotation angle θ that the camera rotates between the first position and a second position about the rotation axis that passes through the center point of the photo sensor is obtained. When the camera is at the second position, the projection of the target image on the reference plane may overlap with or may be at the same location as the projection of the center point of the photo sensor on the reference plane.

At S83, the distance between the target and the camera is calculated based on the distance x and the rotation angle θ.

In one embodiment, the first position may be the initial position and the second position may be the position after the rotation. In some embodiments, the distance measuring method further includes the following processes.

When the camera is at the first position, the camera is controlled to capture the first image. A rotator is controlled to drive the camera to rotate about the rotation axis that passes through the center point of the photo sensor. The camera is controlled to capture images during the rotation. Based on the images captured by the camera during the rotation, it is determined whether the projection of the target image on the reference plane overlaps with or is at the same location as the projection of the center point of the photo sensor on the projection plane. When it is determined that the projection of the target image on the reference plane overlaps with or is at the same location as the projection of the center point of the photo sensor on the projection plane, an angle measuring device is controlled to measure the rotation angle θ of the camera.

In another embodiment, the second position may be the initial position and the first position may be the position after the rotation. The distance measuring method further includes the following processes.

When the camera is at the second position, the rotator is controlled to drive the camera to rotate in the rotation plane about the rotation axis that passes through the center point of the photo sensor.

After the rotator rotates for a time period, an angle measuring device is controlled to measure the angle θ that the camera rotates. At this moment, the camera may be at the first position.

The camera is controlled to capture a first image.

In one embodiment, controlling the rotator to drive the camera to rotate about the rotation axis that passes through the center point of the photo sensor includes the following processes.

Based on a positional relationship between the target and the camera, a rotation direction of the camera in the rotation plane is determined.

Based on the rotation direction, the rotator is controlled to drive the camera to rotate about the rotation axis that passes through the center point of the photo sensor.

In one embodiment, the distance between the target and the camera is calculated using the equation $$L = \frac{xf}{x - f\tan\theta}.$$

In the above equation, L refers to a vertical distance from the projection of the target on the reference plane to an intersecting line formed by an image plane of the photo sensor intersecting with the reference plane. f refers to the focal length of the lens.

In one embodiment, the focal point of the lens may be located at the center point of the photo sensor.

In one embodiment, the distance measuring method further includes obtaining an image captured by the camera and determining whether a plurality of objects are included in the image. The distance measuring method also includes selecting the target from the plurality of objects in the image captured by the camera when the plurality of objects are detected in the image.

In one embodiment, the method for selecting the target from the plurality of objects in the image captured by the camera includes detecting features of the objects in the image. The method for selecting the target also includes, when the features of an object match the features of a previously-stored target, the object being currently detected is determined to be the target.

The foregoing description of the embodiments of the disclosure has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the disclosure does not imply a limitation on the invention, and no such limitation is to be inferred. The invention is limited only by the spirit and scope of the appended claims. Moreover, these claims may refer to "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the disclosure. It should be appreciated that variations may be made in the embodiments described by persons skilled in the art without departing from the scope of the present invention as defined by the following claims. Moreover, no element or component in the present disclosure is intended to be dedicated to the public regardless of whether the element or component is explicitly recited in the following claims.

What is claimed is:

1. A distance measuring device coupled to a camera and a rotator for driving the camera to rotate, the camera including a photo sensor and a lens, the distance measuring device comprising a processor that is configured to:
   obtain an unaligned target image of a target captured by the camera, a projection of the unaligned target image on a reference plane not overlapping with a projection of a center point of the photo sensor on the reference plane, the reference plane being perpendicular to a rotation axis of the camera;
   calculate a projection distance x between the projection of the unaligned target image and the projection of the center point;
   obtain a rotation angle θ between an unaligned position at which the camera captures the unaligned target image and an aligned position at which the camera captures an aligned target image of the target, a projection of the aligned target image on the reference plane overlapping with the projection of the center point of the photo sensor; and
   calculate a target distance L between the target and the imaging camera based on the projection distance x, the rotation angle θ, and a focal length f of the lens according to $$L = \frac{xf}{x - f\tan\theta}.$$

2. The distance measuring device of claim 1, wherein the processor is configured to:
   calculate a first product of the projection distance x and the focal length f of the lens;
   calculate a tangent function of the rotation angle θ;
   calculate a second product of the tangent function of the rotation angle θ and the focal length f of the lens;
   calculate a difference value between the projection distance x and the second product; and
   divide the first product by the difference value to obtain the target distance L.

3. A distance measuring system, comprising:
   a camera having a photo sensor and a lens, configured to rotate along a rotation axis to capture an unaligned target image and an aligned target image of a target, wherein:
      a projection of the unaligned target image on a reference plane does not overlap with a projection of a center point of the photo sensor on the reference plane,
      a projection of the aligned target image on the reference plane overlaps with the projection of the center point, and
      the reference plane is perpendicular to the rotation axis;
   a rotator coupled to the camera, configured to drive the camera to rotate along the rotation axis; and
   a processor configured to:
      obtain a projection distance x between the projection of the unaligned target image and the projection of the center point of the photo sensor, and
      obtain a rotation angle θ between an unaligned position at which the camera captures the unaligned target image and an aligned position at which the camera captures the aligned target image, wherein:
         the processor includes a calculator that is configured to calculate a target distance L between the target and the camera based on the projection distance x, the rotation angle θ, and a focal length f of the lens according to $$L = \frac{xf}{x - f\tan\theta}.$$

4. The distance measuring system of claim 3, further comprising:
   a camera controller coupled to the camera and configured to control the camera to capture target images of the target during the rotation;
   a detector coupled to the camera and the camera controller, and configured to detect a position of a projection of each of the target images on the reference plane; and
   a rotation controller coupled to the camera controller and the rotator, and configured to control the rotator to stop the camera to rotate when the projection of one of the target images overlaps with the projection of the center point of the photo sensor.

5. The distance measuring system of claim 3, further comprising:
a rotation controller coupled to the rotator and configured to control the rotator to drive the camera to continuously rotate for a time period after the aligned target image is captured.

6. The distance measuring system of claim 3, wherein the processor is further configured to:
obtain a positional relationship between the target and the camera,
determine a rotation direction for the camera based on the positional relationship, and
control the rotator to drive the camera to rotate based on the rotation direction.

7. The distance measuring system of claim 3, further comprising:
an angle measuring device coupled to one of the rotator or the camera, and configured to measure the rotation angle θ.

8. The distance measuring system of claim 7, wherein the calculator is coupled to the camera and the angle measuring device.

9. The distance measuring system of claim 3, wherein the calculator is configured to:
calculate a first product of the projection distance x and the focal length f of the lens;
calculate a tangent function of the rotation angle θ;
calculate a second product of the tangent function of the rotation angle θ and the focal length f of the lens;
calculate a difference value between the projection distance x and the second product; and
divide the first product by the difference value to obtain the target distance L.

10. The distance measuring system of claim 3, wherein:
a focal point of the lens is located at the center point of the photo sensor.

11. The distance measuring system of claim 3,
wherein the processor is further configured to:
obtain an image captured by the camera,
detect objects in the image, and
select the target from the objects.

12. The distance measuring system of claim 11, wherein the processor is configured to:
obtain features of the objects, compare the features of the objects with a preset feature, and determine the target according to whether the features match the preset feature.

13. A distance measuring method for measuring a target distance between a target and a camera, comprising:
rotating the camera along a rotation axis to capture an unaligned target image and an aligned target image, wherein:
a projection of the unaligned target image on a reference plane does not overlap with a projection of a center point of a photo sensor of the camera on the reference plane,
a projection of the aligned target image on the reference plane overlaps with the projection of the center point, and
the reference plane is perpendicular to the rotation axis;
measuring a projection distance x between the projection of the unaligned target image and the projection of the center point of the photo sensor;
measuring a rotation angle θ of the camera between an unaligned position at which the camera captures the unaligned target image and an aligned position at which the camera captures the aligned target image; and
calculating the target distance L according to $$L = \frac{xf}{x - f\tan\theta},$$

wherein:
L represents the target distance,
x represents the projection distance,
θ represents the rotation angle, and
f represents a focal length of the lens.

14. The distance measuring method of claim 13, wherein rotating the camera to capture the unaligned target image and the aligned target image comprises:
capturing target images of the target during the rotation;
detecting a position of a projection of each of the target images on the reference plane; and
controlling the camera to stop rotating when the projection of one of the target images overlaps with the projection of the center point of the photo sensor.

15. The distance measuring method of claim 13, wherein rotating the camera to capture the unaligned target image and the aligned target image comprises:
continuously rotating the camera for a time period after capturing the aligned target image.

16. The distance measuring method of claim 13, wherein rotating the camera to capture the unaligned target image and the aligned target image comprises:
obtaining a positional relationship between the target and the camera;
determining a rotation direction for the camera based on the positional relationship; and
rotating the camera according to the rotation direction.

17. The distance measuring method of claim 13, wherein:
a focal point of the lens is located at the center point of the photo sensor.

18. The distance measuring method of claim 13, further comprising:
capturing an image by the camera;
detecting objects in the image; and
selecting the target from the objects.

19. The distance measuring method of claim 18, wherein selecting the target from the objects comprises:
obtaining features of the objects;
comparing the features of the objects with a preset feature; and
determining the target according to whether the features match the preset feature.

\* \* \* \* \*